July 14, 1931.  I. J. SHELTON ET AL  1,814,340
AUTOMOBILE TIRE
Filed Jan. 5, 1928
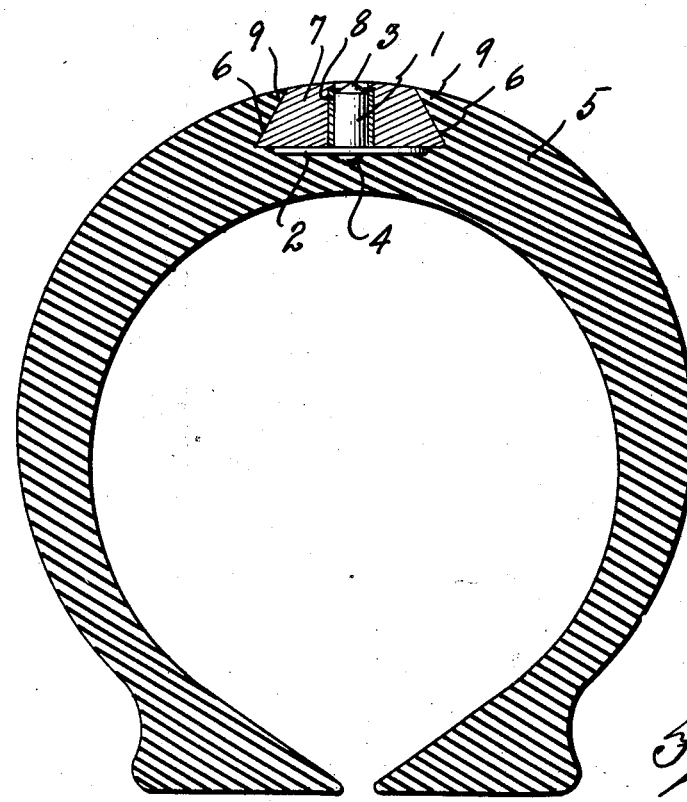
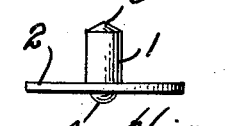
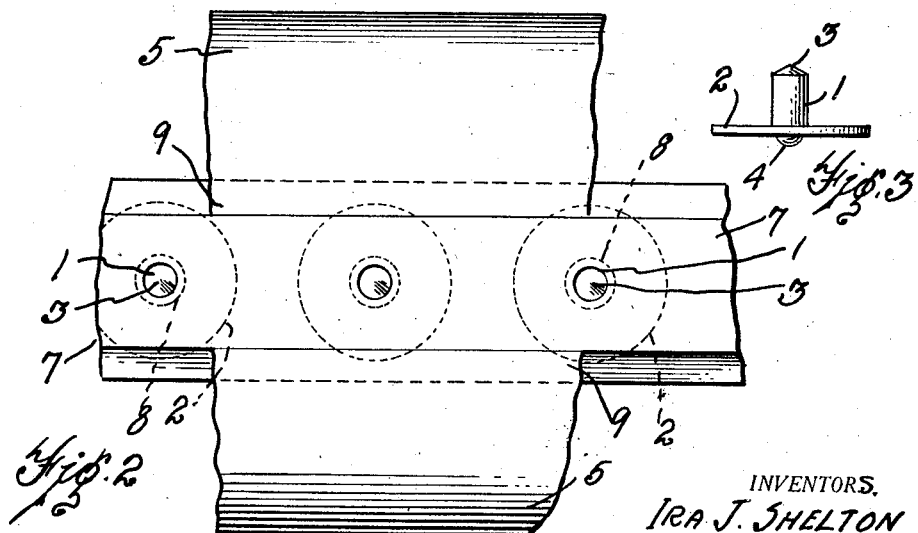
INVENTORS.
IRA J. SHELTON
BY CHARLES V. JACOBI
ATTORNEY.

Patented July 14, 1931

1,814,340

UNITED STATES PATENT OFFICE

IRA J. SHELTON, OF DETROIT, AND CHARLES V. JACOBI, OF GROSSE POINTE FARMS, MICHIGAN

AUTOMOBILE TIRE

Application filed January 5, 1928. Serial No. 244,595.

This invention relates to automobile tires, and the object of the invention is to provide a tire having an annular tread strip in its tread through which non-skid members supported in the tire may extend into engagement with the road surface.

Another object of the invention is to provide a series of metal non-skid members each having a flange supported in the tire and a tread strip engaging over the flanges to hold the non-skid members in place and through which the non-skid members extend into contact with the road surface.

Another object of the invention is to provide a means whereby the non-skid members are prevented from movement circumferentially of the tire to hold the tread strip from creeping.

A further object of the invention is to provide a tire having a circumferential groove undercut at the sides into which the tread strip extends and which firmly holds the tread strip in the tire when the tire is inflated.

These objects and the several novel features of the invention are hereinafter more fully described and claimed, and the preferred form of construction by which these objects are attained is shown in the accompanying drawings in which—

Fig. 1 is a section through a tire embodying our invention.

Fig. 2 is a view of a portion of the tire showing the tread strip mounted therein.

Fig. 3 is an elevation of one of the non-skid members.

The non-skid members, as shown in Figs. 1 and 3, comprise each a stud 1 having an enlarged base or flange 2 and the stud is formed of hardened metal having a pointed end 3. A lug 4 is provided on the under side of each flange 2 and seats in one of a series of recesses provided therefor in the bottom of the circumferential groove in the tire as shown in Fig. 1. The tire casing 5 is provided with a circumferential groove as shown having undercut edges 6 at the opposite sides and non-skid members 1 are positioned in the bottom of this groove with the rounded lugs 4 engaging in the recesses therefor in the tire casing and with the pointed studs extending outwardly. A tread strip 7 is fitted into the circumferential groove in the tire casing before the tire is inflated and the edges of this strip extend under the undercut edges 6 of the tire casing. This holds the tread strip in the tire casing and prevents it from coming out by the pressure applied after the tire is inflated. The tread strip is provided with apertures for the non-skid studs 1 and the tread strip is provided with a series of metal sleeves 8 embedded therein and engaging over the studs 1 as shown in Figs. 1 and 2. After the tread strip has been inserted in the tire tread it holds the non-skid members in place therein and by means of the lugs 4 engaging in the recesses provided in the tire casing, the non-skid members prevent the tread strip 7 from creeping.

It will be noted from Fig. 1 that the point 3 of the stud 2 extends flush with the surface of the tire. In operation, as the stud comes into contact with the road surface the tire is flattened slightly at the center so that the point 3 of the stud extends outwardly into engagement with the road surface. By the engagement of these studs with the road surface as the wheel is rotated skidding is prevented as the studs being of hardened steel cut into the surface of the road slightly. These studs also provide excellent traction on ice so that a car may be started without the wheels slipping. When the studs and tread strip become worn it is a simple matter to deflate the tire and remove them and insert a new tread strip and studs. When inserting the tread strip in the tire the edges 9 of the tire at the sides of the circumferential groove being of rubber may be turned back to allow the tread strip to be readily inserted and by extending over the edges of the tread strip these edges 9 retain the tread strip in the tire. It will thus be seen that by the flexing of the tire the studs are pushed out into contact with the road surface where the tire comes in contact with the road.

From the foregoing description it becomes evident that the device is very simple and efficient in operation; is firmly held in a tire; will not easily get out of order and provides a device which accomplishes the objects described.

Having thus fully described our invention, what we claim is—

1. In an automobile tire, a tire casing having a circumferential groove in the tread provided with a series of recesses in the bottom of the groove spaced circumferentially of the tire, a series of studs each having an enlarged base or flange resting on the bottom of the groove, each flange having a rounded lug on the bottom engaging the respective recess in the bottom of the groove, a tread strip positioned in the groove and having a series of apertures through which the studs extend, and a metal sleeve embedded in the wall of each aperture and engaging over the respective stud.

2. In an automobile tire, a tire casing having a circumferential groove in the tread provided with undercut edges, a series of studs each having an enlarged base or flange resting in the bottom of the groove, the studs being spaced circumferentially of the tire, and a tread strip positioned in the groove and extending beneath the undercut edges at the opposite sides and having a series of apertures through which the studs extend, each aperture being provided with a metal sleeve embedded in the tread strip and engaging over the respective stud and permitting longitudinal movement of the stud in the sleeve.

3. In an automobile tire, a tire casing having a circumferential groove in the tread, a series of studs each having an enlarged base or flange positioned in the bottom of the groove, the opposite end of each stud having a point extending flush with the tire tread, and a tread strip positioned in the groove and having a series of apertures through which the studs extend, said strip having a width of tread surface approximately equal to the width of the base of the studs.

4. In an automobile tire, a tire casing having a circumferential groove in the tread provided with undercut edges, a series of studs each having an enlarged base positioned in the groove in spaced relation circumferentially of the tire, and a tread strip positioned in the groove and extending beneath the undercut edges and provided with a series of apertures through which the studs extend, said strip having a width of tread surface approximately equal to the width of the base of the studs.

5. In an automobile tire, a tire casing having a circumferential groove in the tread, a series of studs mounted in the groove in spaced relation circumferentially of the tire and a tread strip positioned in the groove and having apertures through which the studs extend normally flush with the tread face of the strip and tend to project to contact with the road surface through the flexing of the strip at the points in contact with the road surface.

In testimony whereof we sign this specification.

IRA J. SHELTON.
CHARLES V. JACOBI.